April 9, 1968            E. FRISCH            3,377,254

FUEL ARRANGEMENT FOR A NUCLEAR REACTOR

Original Filed Dec. 1, 1961            4 Sheets-Sheet 1

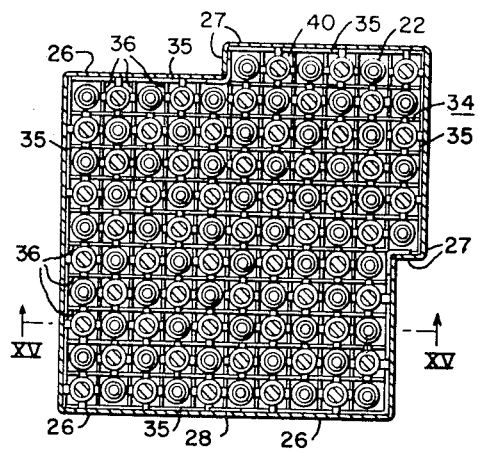
Fig.5.
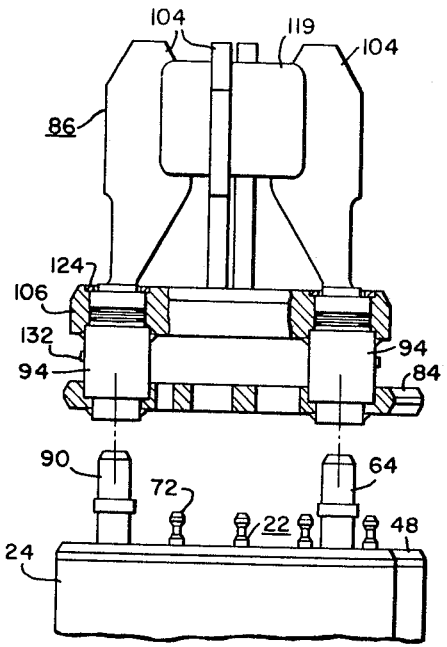
Fig. 7.
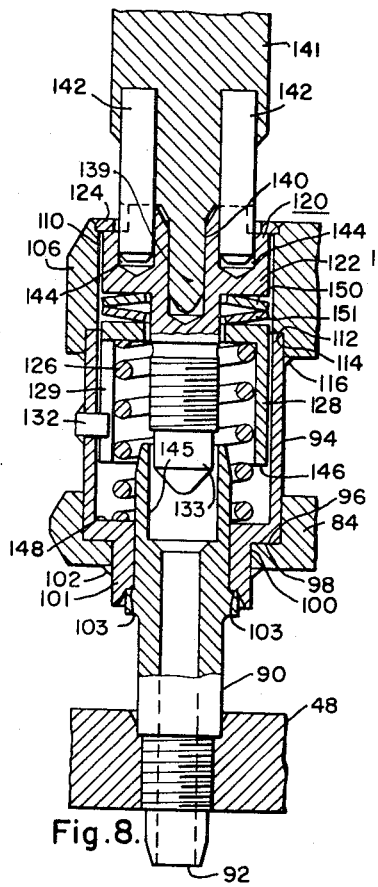
Fig.8.
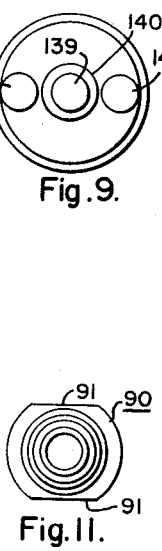
Fig.9.
Fig.11.
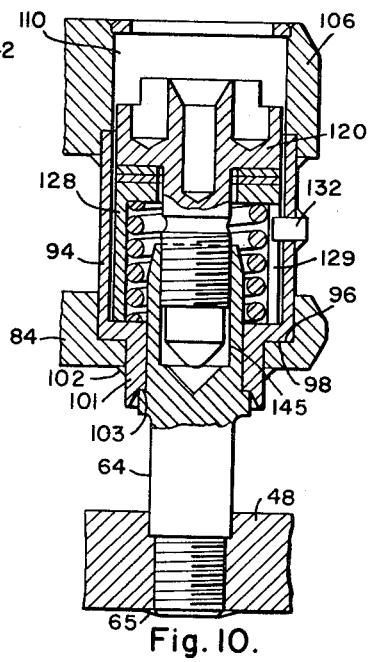
Fig.10.

3,377,254
FUEL ARRANGEMENT FOR A NUCLEAR
REACTOR
Erling Frisch, Pittsburgh, Pa., assignor to Westinghouse
Electric Corporation, Pittsburgh, Pa., a corporation of
Pennsylvania
Continuation of application Ser. No. 540,360, Apr. 5,
1966, which is a division of application Ser. No.
156,370, Dec. 1, 1961, now Patent No. 3,255,091,
dated June 7, 1966. This application Feb. 3, 1967,
Ser. No. 613,965
9 Claims. (Cl. 176—78)

ABSTRACT OF THE DISCLOSURE

A nuclear fuel assembly is provided containing a bundle of elongated fuel rods arranged in a longitudinally parallel array. The fuel rods are supported and are laterally positioned relative to one another by at least one grid member and are prevented from substantial longitudinal movement by a pair of plate members positioned outwardly of the ends of the fuel elements. Means are provided for positioning the grid member between the plate means. The grid positioning means includes at least one elongated member secured to each of the plate means and extending through one of the openings in the grid member. In one example of the invention, the grid supporting means comprises a plurality of tie rods.

---

This application is a continuation of application Ser. No. 540,360, filed Apr. 5, 1966, and now abandoned and the latter application is a division of application Ser. No. 156,370, filed Dec. 1, 1961, and now Patent No. 3,255,091 and assigned to the same assignee as the present application.

The present invention relates to nuclear reactors and more particularly to fuel arrangements for use therein.

One general structural form commonly used for providing a fuel inventory in nuclear reactors is that in which numerous elongated elements or rods containing fissile material are arranged, within a prescribed volume, in a parallel array in the upstanding direction between upper and lower support plates. To provide integrity in the support relations, the fuel rods are divided into groups and the rods in each group are formed as a sub-assembly prior to placement between the support plates. A fluid having coolant and, if desired, neutron moderating properties, flows along and among the fuel rods as a vehicle for energy transfer.

It is advantageous in many instances that each fuel arrangement or sub-assembly include a frame structure for supporting the fuel rods and that such a structure be so formed as to enable the fuel rods to be removed individually by remote equipment. As an economy, following rod removal, the frame structure of the sub-assembly can then be reused as a support for newly inserted rods. Thus, spent rods can be readily replaced in the frame structure, and in multi-region reactors, where sub-assemblies are periodicaly moved from region to region, the exact burn-up condition of the fuel rods which are being moved into a new region can be determined. Further, in experimental reactors, freedom is provided in the positioning of fuel rods for various burn-up tests.

There are in any event other physical functions which desirably are provided by a frame-type fuel arrangement or sub-assembly. A primary one of these is, of course, that its frame structure support the fuel rods against lateral displacement so as to prevent localized neutron flux peaking and thereby permit operation of the reactor closer to its design power limit. Longitudinal movement of the fuel rod is also to be restricted; but in many applications, where bowing of the fuel rods would otherwise occur, it is desirable to allow some limited longitudinal movement of the fuel rods to compensate for thermal expansion. The latter provision also prevents localized neutron flux peaking as described in a copending application of Erling Frisch, entitled "Fuel Arrangement For a Nuclear Reactor," filed Apr. 4, 1960, Ser. No. 19,851, now abandoned and assigned to the present assignee. In addition, the sub-assembly and its included frame structure desirably should offer a minimal restriction to coolant flow along and among the fuel rods.

Accordingly, it is an object of the invention to provide a novel fuel arrangement for a nuclear reactor.

It is a further object of the invention to provide a novel fuel arrangement wherein elongated fuel elements are supported laterally by at least one grid member which is provided with novel structure for establishing the lateral support while minimally obstructing coolant flow.

An additional object of the invention is to provide a novel fuel arrangement wherein the end of the arrangement is provided with a readily removable fixture to provide access for removal of the fuel elements.

A further object of the invention is to provide a novel fuel arrangement wherein an elongated frame structure is provided for supporting the fuel elements and wherein a plurality of grid members are extended laterally across the frame member to provide lateral support for the fuel elements while enabling longitudinal removal of the same.

An additional object of the invention is to provide a novel fuel arrangement wherein a frame member for supporting a plurality of fuel elements comprises a plurality of tie rods which extend through respective openings in each of the grids and are held in rigid relation to each other by the grid members.

These and other objects and advantages of the present invention will become more apparent upon consideration of the following detailed description along with the attached drawings, in which:

FIG. 5 is a cross sectioned view of the fuel arrangement of FIG. 1 and is taken along reference line V—V of FIG. 1 to show the support relationship between a grid member and the various fuel elements;

FIG. 7 is an exploded elevational view of a portion of the fuel arrangement of FIG. 1 showing the manner in which an end handling fixture is located in the arrangement;

FIG. 8 is an enlarged partially sectioned view of a portion of the fuel arrangement of FIG. 1 to show the manner in which the handling fixture is secured in its assembled position;

FIG. 9 is a bottom plan view of a portion of a handling tool used to secure and unsecure the handling fixture;

FIG. 10 is an enlarged partially sectioned view of another portion of the fuel arrangement of FIG. 1 showing relations similar to those shown by FIG. 8;

FIG. 11 is an enlarged bottom plan view of a stud used in the assembly of the handling fixture;

According to the broad principles of the invention, a nuclear fuel arrangement comprises a plurality of elongated parallel fuel elements which are supported relative to each other through the use of supporting means including elongated frame means. At least one grid member extends laterally across the frame means or member and has respective openings through which the fuel elements extend. The grid member is provided with resilient means, such as dimples, projecting into the openings for supporting the fuel elements against lateral displacement and, to a given extent, frictionally against longitudinal movement. Further, a plate is secured adjacent one end of the frame member and has respective coolant passages aligned with alternate ones of the fuel elements, and another plate is secured adjacent the other end of the frame member and has respective coolant passages aligned with the remaining ones of the fuel elements. The individual fuel elements can thereby be inserted into and removed from the frame member through the end plates with the use of structurally cooperative remote handling tools. Further, a retaining plate and handling fixture sub-assembly is positioned outwardly of each of the end plates when the fuel elements are inserted within the frame member, and securing means are employed to attach the handling fixture and retaining plate sub-assemblies relative to the frame member in such a manner as to ensure a secure assembly yet to enable these parts to be removed readily through the use of structurally cooperative remote handling tools.

Figure 1:
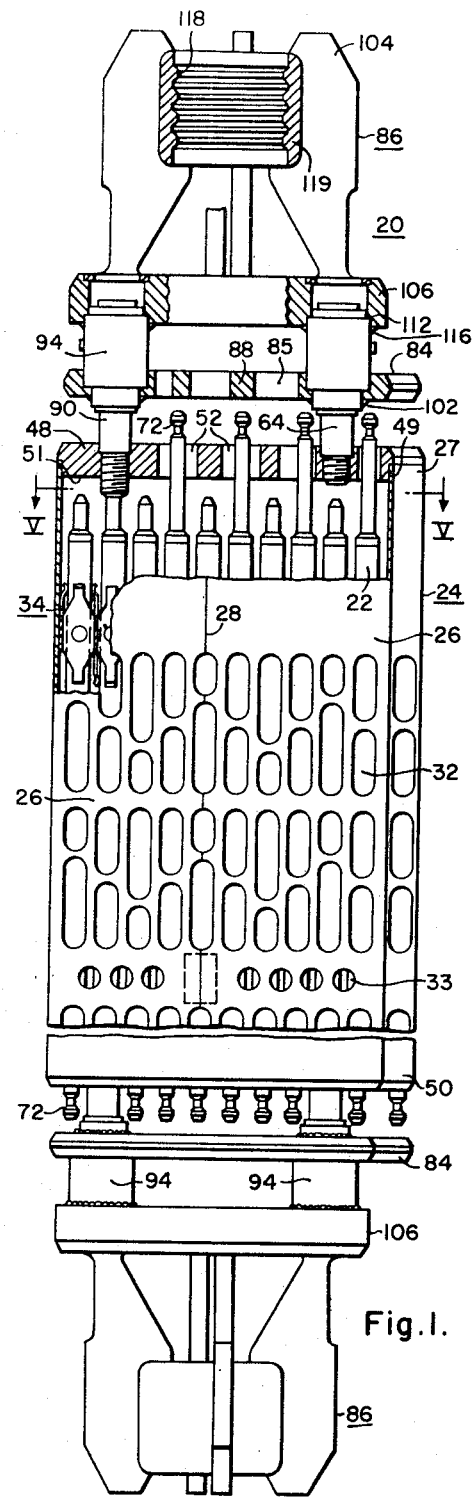
FIGURE 1 is a partially sectioned elevational view of a fuel arrangement formed in accordance with the principles of the invention.
Figure 2:
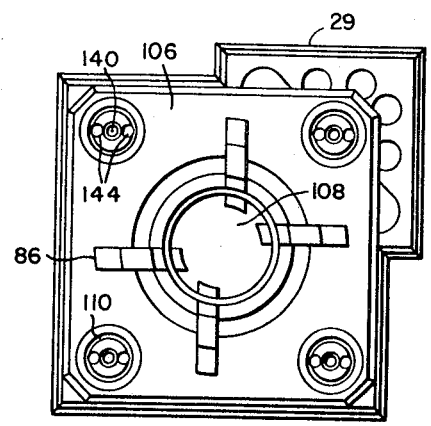
FIG. 2 is a top plan view of the fuel arrangement shown in FIG. 1.

More specifically, in FIG. 1 there is shown a fuel arrangement 20 comprising a plurality of elongated parallel fuel elements 22, which suitably contain a given quantity of fissionable material, and supporting means for the elements 22 including elongated frame means 24 in which the fuel elements 22 are located. In this instance, the frame means or member 24 includes three elongated bracket parts 26 and a similar bracket part 27 which are joined together, as by seam welding indicated by the reference character 28, and which are also held in rigid relation by a pair of end plates 48 and 50 secured or welded thereto as indicated by the reference character 49. The bracket part 27 is so formed as to produce, in this example, an offset portion 29 (FIG. 2) in the frame member 24. Flow openings 32 are provided in the brackets 26 so as to induce cross-flow of the employed coolant, and the form of the coolant openings 32 is such as to maximize both this flow and structural stiffness. In addition, the brackets 26 include openings 33 to provide access for a probe to check fuel element spacing.

The material selected for use in forming the frame member 24 should provide maximum structural strength consistent with low neutron absorption cross section. For example, stainless steel is suitable for this purpose.

A grid member 34 is secured to and extended laterally across the brackets 26 and 27 for the purpose of providing lateral support for the fuel elements or rods 22. A plurality of grids 34 can be secured to the brackets 26 and 27 at various spacings along the length of the brackets 26 and 27 to provide the amount of lateral support desired.

As viewed in FIGS. 5, 14, 15 and 16, the grid 34 is comprised of a plurality of straps 36 which are interwoven in a grid-like manner. Generally, this configuration is similar to that described in the aforementioned copending application and specific description of the grid member 34 will be limited here to that subject matter which pertains to the present invention. Thus, it is to be noted that the straps 36 are interfitted through the use of opposing latching means or slots (as indicated by the reference character 37 in FIG. 16) which allow the straps 36 to be interlatched at their various intersections.

In the formation of the grid 34, the latching means are employed with all of the straps 36 as well as boundary straps 35 (FIG. 5) and consequently in the preliminary assembly of the grid 34 each of the straps 36 which intersects the boundary straps 35 is provided with an extension 39 (FIG. 16) which projects laterally outward of the intersected boundary strap 35. When the straps 35 and 36 are pre-assembled as described, the entire assembly is then permanently secured together, for example through the use of a furnace brazing operation. After this operation, the lateral extensions 39 of the straps 36 can then be ground off flush with the boundary straps 35. As viewed in FIG. 14, securance of the strap members 35 and 36 to each other is accomplished by welding, as generally indicated by the reference character 38. The grid 34 can then be welded or otherwise secured to the brackets 26 and 27 so as to be supported suitably for performance of the lateral fuel rod supporting function. In turn, the grid or grids 34 also contribute to rigidizing the brackets 26 and 27.

Figure 15:
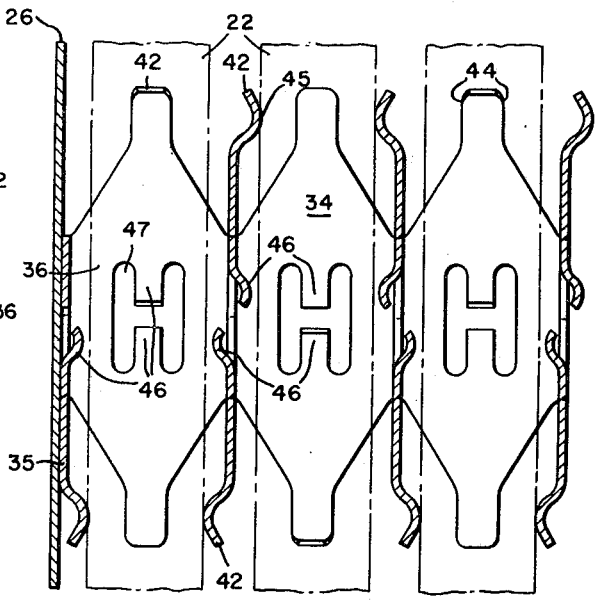
FIG. 15 is a portion of an enlarged sectional view taken along the reference line XV—XV of FIG. 5 with the fuel elements being partially represented by dotted lines.
Figure 16:
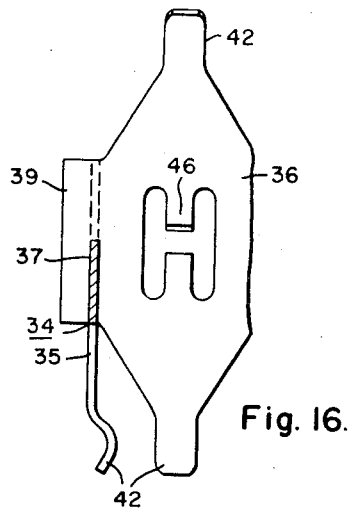
FIG. 16 shows a boundary portion of the grid member of FIG. 5 prior to its completion.

The grid 34 is provided with respective openings 40 (FIG. 14) for receipt of the fuel rods 22. Further, each strap 35 or 36 is provided with resilient means including respective elongated cantilever spring taps 42 which are deflected from the strap plane to project into each adjacent opening 40 for lateral support of the fuel rods 22. As viewed in FIG. 14, each tap 42 is relatively narrow, as indicated by reference character 44, along its line of deflection from its strap 36 as compared to the dimension of the portion of the adjacent strap side which faces into the associated opening 40. The taps 42 can have substantially uniform width along their length as shown, and in any event desirably should be so sized as to render negligible the risk of fracture or setting from applied fuel rods forces. If, as shown, the tabs 42 are relatively minimized in width adjacent their respective lines of deflection from the straps 35 and 36, then the tabs 42 can be so sized in width along their length as to provide maximum resilient lateral support for the fuel rods 22 consistently with minimum obstruction to coolant flow. To facilitate insertion of the fuel rods 22 and to minimize the engagement surfaces, the taps 42 are rounded as indicated by the reference character 45 (FIG. 15).

In addition, an H or other shaped stamp can be taken from each of the straps 36 (and, if desired, the straps 35) adjacent each of the openings 40 so as to produce respective pairs of deflectable tabs 46 (FIG. 15) and so as to produce respective openings 47 for promotion of coolant cross-flow among the grid openings 40. The tabs 46 of each tab pair are then deflected to opposite sides of their strap 36 so that each strap 36 is also provided with a tab 46 projecting into each adjacent grid opening 40. It is to be noted that the extent to which the tabs 46 project into the grid openings 40 is less than the extent to which the tabs 42 project into the grid openings 40. The purpose of the tabs 46, therefore, is to serve as secondary supporting elements for the fuel rods 22 in the event of respectively aligned spring tabs 42 become bent or otherwise fail as a result of insertion or removal or other forces from the fuel rods 22. In this manner, the secondary tabs 46 provide safety against "hot spots" or excessive local temperature rises which could otherwise occur on any fuel rods 22 adjacent to a failed spring tab 42.

Once the desired number of grids 34 are secured to the brackets 26, the end plates 48 and 50 can be secured to the brackets 26 as previously described. The plate 48 is provided with a plurality of coolant openings 52 which are aligned with alternate ones of the fuel rods 22. Similarly the end plate 50 is provided with a plurality of coolant openings 52 which are aligned with the remaining ones of the fuel rods 22. Thus, alternate fuel rods 22 can be inserted within the frame member 24 through the coolant openings 52 in the upper end plate 48 and the remaining fuel rods 22 can be inserted within the frame member 24 through the lower end plate 50.

Figure 6:
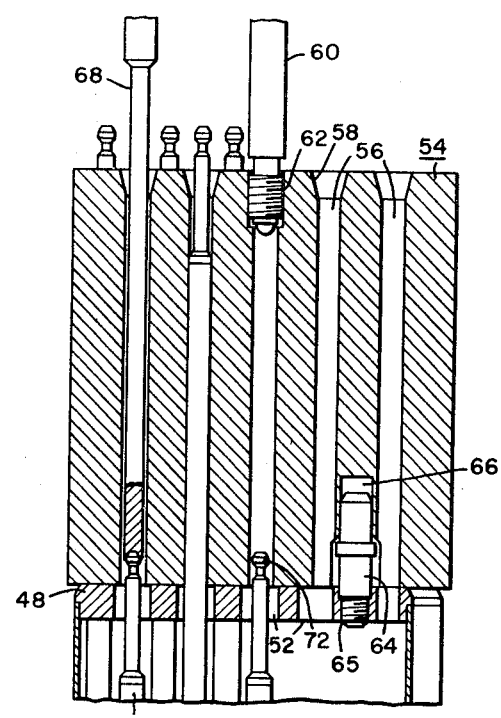
FIG. 6 is a partially sectioned view of a portion of the fuel arrangement of FIG. 1 showing the manner in which fuel elements are inserted into the arrangement.
Figure 14:
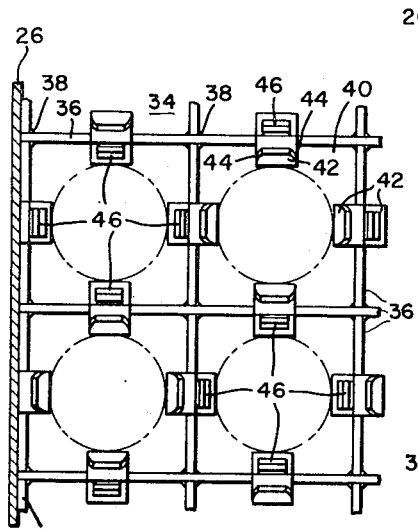
FIG. 14 is an enlarged top plan view of a portion of the grid member shown in FIG. 5.

To insert the fuel rods 22 in the manner just described, it is desirable that a guide block 54 be employed as shown in FIG. 6. The guide block 54 is suitably sized in the lateral direction to cover either end of the frame member 24 when it is desired to insert fuel rods 22 therein. Additionally, the guide block is suitably sized in the longitudinal direction to hold the fuel rods 22 against tipping movement during the insertion process. A plurality of channels 56 are provided in the guide block 54 in alignment with the end plate openings 52 and alternate ones of the grid openings 40. Each of the channels 56 is flared adjacent its other end as indicated by the reference character 58 for the purpose of facilitating entry of the fuel rods 22 therein.

A lifting rod 60, operated by remote equipment, can be used to position the guide block 54 and threadedly engaged with the guide block 54 as indicated by the reference character 62 for this purpose. Indexing of the guide block on either end plate 48 or 50 is accomplished through the use of a pair of studs 64 which are threadedly engaged with each end plate 48 or 50 and which mate with recesses 66 in the guide block 54. The studs 64, which can be welded as indicated by the reference character 65, also have other functional purposes as will subsequently be described. When it is desired to insert the fuel rods 22 into the frame member 24, the fuel rods 22 are placed into the guide block channels 56 and pushed inwardly of the adjacent end plate 48 or 50 and the frame member 24 through the use of a push rod 68 which is also operated by remote equipment. Entering movement of the fuel rods 22 is limited by the opposite end plate 50 or 48 as indicated by the reference character 51 in FIG. 1. Since the guide block channels 56 are aligned with the grid openings 40, insertion of the fuel rods 22 is ordinarily accomplished without any difficulty.

Figure 13:
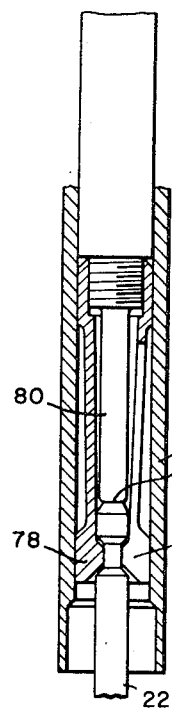
FIGS. 12 and 13 are partially sectioned elevational views of a portion of a fuel element and a handling tool showing the manner in which the tool is employed to engage the fuel element for its removal from the fuel arrangement of FIG. 1.
Figure 12:
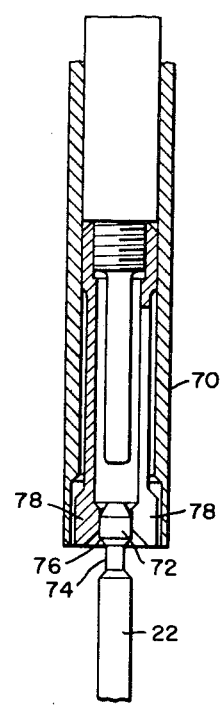

At this point in the description, the manner in which fuel rods 22 are removed from the frame member 24 is also to be considered. Thus, as shown in FIGS. 12 and 13, a handling tool 70 is placed over a fuel rod 22 adjacent an end portion 72 which is normally positioned outwardly of the adjacent end plate 48 or 50 (FIG. 1). A neck portion 74 is provided intermediate the fuel rod end portion 72 and the main body of the fuel rod 22 so that an inwardly facing shoulder 76 provides a surface for positive gripping by the handling tool 70 in effecting the removal of the fuel rod 22.

The handling tool 70 is provided with gripping arms 78 which are suitably spring loaded toward each other. FIG. 12 shows the handling tool arms 78 just after they have been inserted over the fuel rod end portion 72. FIG. 13 shows the handling tool arms 78 after they have snapped into engagement with the fuel rod neck portion 74 and the shoulder 76 and after some upward movement of the fuel rod 22 has been initiated. It is to be noted that the handling tool 70 is also suitably provided with an inner leg 80 which provides a longitudinal limit of inward movement (as indicated by the reference character 82) for the fuel rod end portion 72 after the tool arms 78 have engaged the fuel rod shoulder 76.

Each of the fuel rods 22 can be removed from the frame member 24 in the manner just described. It is to be noted that because of the structural nature of the fuel arrangement 20 so far described, insertion and removal of the fuel rods 22 can be readily accomplished by remote handling equipment, as would be necessary when the fuel arrangement 20 has been irradiated so that handling would have to be done in a water or other radiation-safe pit.

To complete the fuel arrangement 20, a retaining plate 84 and a handling fixture 86 are assembled over each end plate 48 and 50. The retaining plate 84 and the fixture 86 can be separate elements, integrated if desired into a sub-assembly as in this embodiment of the invention, or in other applications can be integrally formed at origin. Each retaining plate 84 is provided with a plurality of coolant passages 85 which are so located as to enable intermediate retaining plate portions 88 to serve as stops to prevent adjacent fuel rods 22 from longitudinally escaping from the frame member 24 through the coolant openings 52 in the end plate 48 or 50. The studs 64 serve to space the retaining plates 84 outwardly of the end plates 48 and 50; and studs 90, threadedly engaged with the end plates 48 and 50, are also provided for this purpose. The studs 90 differ from the studs 64 only because in this particular embodiment they are located in what would normally be a coolant opening 52 and are, therefore, so designed as to include an inner channel 92 (FIG. 8) for receiving the end portion 72 of the fuel rod 22 in alignment therewith. In this connection, the studs 90 have flat surfaces 91 (FIG. 11) to provide for tool removal of the studs 90 when access to the aligned fuel rods 22 is desired.

Figure 3:
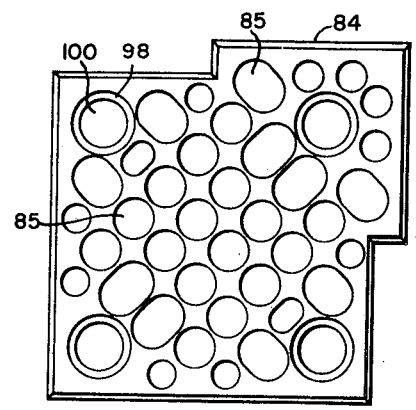
FIG. 3 is a top plan view of a retaining plate used in the fuel arrangement of FIG. 1.
Figure 4:
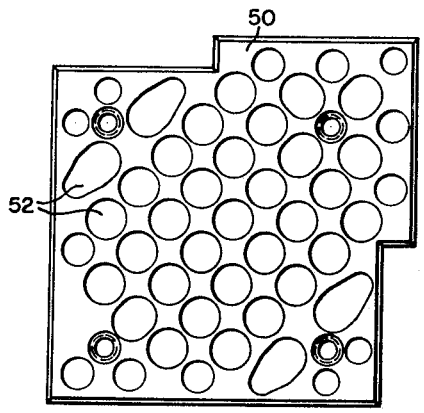
FIG. 4 is a bottom plan view of an end plate used in the fuel arrangement of FIG. 1.

A bushing 94 is provided for placement over each stud 64 or 90 and each of the bushings 94 is provided with a shoulder 96 (FIGS. 8 and 10) which is seated on a ledge 98 adjacent an opening 100 (FIG. 3) in the retaining plate 84 through which a sleeve 101 (FIG. 8) of the bushing 94 is extended. Each bushing 94 can be joined, as by welding, with the retaining plate 84 as indicated by the reference character 102.

The handling fixture 86 (FIGS. 1 and 7) is provided with a plurality of lugs 104 which extend outwardly of a support plate 106, for supporting a serrated or threaded bushing 119 which, in turn, is engageable by a remote handling tool when it is desired to move the entire fuel arrangement 20 if the fixture 86 is secured therewith or when it is desired to move the fixture 86 alone if the latter is not secured as a part of the fuel arrangement 20. The fixture support plate 106 is provided with an inner opening 108 (FIG. 2) for coolant flow and can be provided with additional flow passages if desired. In addition, the fixture support plate 106 is provided with an opening 110 in alignment with each of the bushings 94. A fixture support plate shoulder 112 adjacent each support plate opening 110 is supported on an upper rim portion 114 (FIG. 8) of the associated bushings 94. The bushings 94 can also be joined, as by welding, with the fixture support plate 106 as indicated by the reference character 116, and in this manner a sub-assembled or integrated unit is formed from the retaining plate 84 and the handling fixture 86.

When this integrated unit is formed as described, it is placed over the studs 90 and 64 of the end plate 48 or 50 and securance of the handling fixture 86 and retaining plate 84 relative to the frame member 24 can then be accomplished. Thus, the entire unit can be lowered onto the frame member 24 (FIG. 7) by the aforementioned fixture handling tool when it is threadedly engaged with serrations threading 118 provided on the bushing 119 inwardly of the handling fixture lugs 104. The studs 90 and 64 are matingly received in the bushing sleeves 101 (FIGS. 8 and 10) and serve to support, as indicated by the reference character 103, the bushings 94 in spaced relation to the end plate 48 or 50.

A spring loaded bolting arrangement, as shown in FIG. 8, is employed in this instance to secure the integrated unit with the studs 90 and 64. Thus, a special bolt or fastener 120 is provided with a cylindrical head 122 and is captivated within each bushing 94 by a welded retaining washer 124 which can be welded or otherwise secured to the fixture support plate 106. This prevents the bolts 120 from being lost from the sub-assembly of the handling fixture 86 and the retaining plate 84.

The bolt head 122 is urged against the washer 124 by a coil spring 126 which is housed in a spring cup 128 within the bushing 94. A narrow longitudinal slot 129 is provided in the spring cup 128 and a pin 132, which can be secured or welded to the bushing 94, is extended into the slot 129 to prevent rotation of the spring cup 128 relative to the bushing 94. A cylindrical tip 133 of the bolt 120 extends into a threaded hole in the adjacent end of the associated stud 90 or 64. However, the mateable threads do not contact until downward pressure is exerted on the bolt 120 by a remote handling wrench 141 which is guided into position by a tapered extension 139 entering a central recess 140 in the bolt head 122. Two prongs 142 are guided into mating recesses 144 in the bolt head 122 to provide for twisting the bolt 120.

The bolt 120 is gradually threaded into a stud hole 145 until a lower rim 146 of the spring cup 128 engages a bottom surface 148 of the bushing 94. At this time, Belleville springs 150 and 151 which are located between the spring cup 128 and the bottom of the bolt head 122 are forced into a solid plane as illustrated in FIG. 10 so as to maintain a high pressure on the bolt at all times and prevent loosening of the bolt as a result of vibrations. To permit easy engagement of the bolt and stud threads, the leading end of these threads can be cut back and trimmed until a full thread section is obtained.

When each of the studs 90 or 64 is fully engaged by a bolt 120, the handling fixtures 86 and retaining plates 84 are securely engaged with the end plates 48 and 50 and the fuel arrangement 20 is then completely formed. Positioning of the fuel arrangement 20 can then be readily accomplished in the manner previously described. When the fuel arrangement 20 is placed in a reactor, the handling fixtures 86 are engaged with the previously mentioned upper and lower core support plates to hold the fuel arrangement 20 in its prescribed position.

Figure 17:
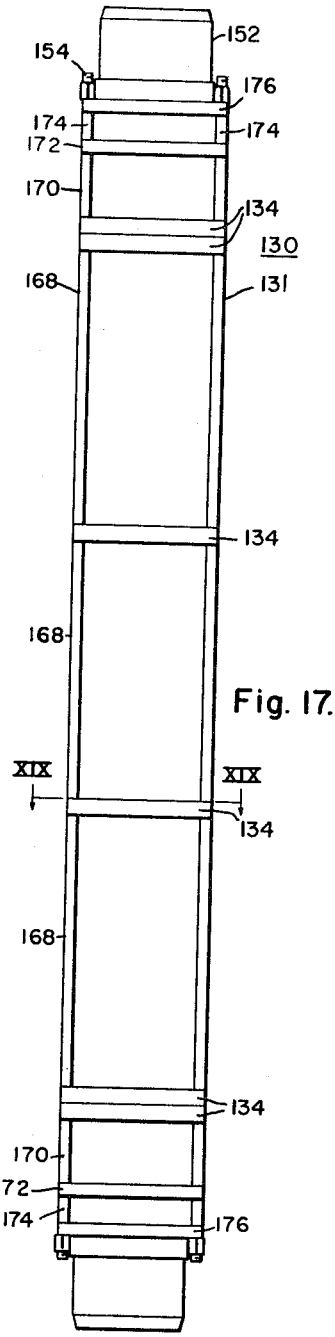
FIG. 17 is an elevational view of a frame structure and other elements of another fuel arrangement formed in accordance with the principles of the invention.

In FIG. 17, there is shown another embodiment of the invention in which a fuel arrangement 130 comprises frame means 131 and a plurality of grid members 134. In this case, fuel elements are not illustrated, but the fuel rods 22, or rods similar thereto, can be used in the frame means 131 if desired. The frame means or member 131 comprises four tie rods 136 which extend through a corner opening 138 (FIGS. 18 and 19) in each of the grids 134. A bushing 166 is secured, for example by welding, to each grid 134 in each corner opening 138; and, in turn, each tie rod 136 is inserted through its respective bushing 166. Thus, the tie rods are held in rigid relation to each other by the grids 134.

Spacers 168 extend along each tie rod 136 between the grids 134. A spacer 170 is also provided on each tie rod above the uppermost and below the lowermost grids 134, and respective end plates 172 are held against the upper and lower sets of spacers 170. Insertion of fuel rods within the frame member 131 can be accomplished in a manner similar to that described for the fuel arrangement 20. Removal of the fuel rods also can be accomplished in a manner similar to that described for the fuel arrangement 20.

Outwardly of the end plates 172, spacers 174 are also provided for spacing a retaining plate 176 from each end plate 172. The retaining plate 176, in this embodiment, is provided as an integral part of a handling fixture 152 and serves to retain fuel rods within the frame member 131 in a manner similar to that described in connection with the fuel arrangement 20. A nut 154 or other securing means is then employed to secure the fixture 152 to each tie rod 136 and thereby completes the formation of the fuel arrangement 130.

Figure 18:
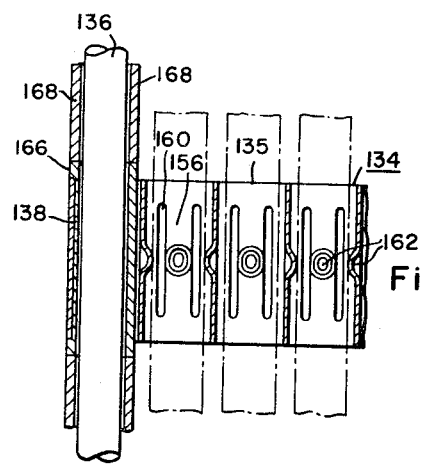
FIG. 18 is a portion of an enlarged partially sectioned elevational view of the fuel arrangement of FIG. 17 showing another grid member and the manner in which it is secured thereto.
Figure 19:
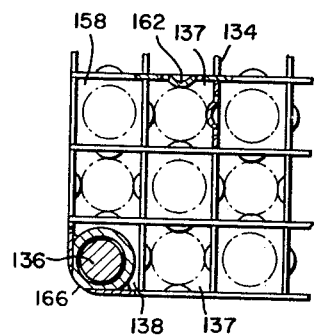
FIG. 19 is a portion of a cross sectional view of the fuel arrangement of FIG. 17 taken along the reference line XIX—XIX.

In this instance, each grid member 134 is formed in the manner shown in FIGS. 18 and 19. The grid 134 is formed from a plurality of straps 135 in a manner similar to that described for the grid 34. However, resilient lateral support for fuel rods is provided through the use of respective strips 156 in each strap 135 adjacent each opening 158. The strips 156 are formed by slits 160 stamped out of the straps 135.

A projection 162 is formed outwardly of each strip 156 for engagement with an adjacent fuel element. Accordingly, the strips 156 serve as resilient supporting members for the engaged fuel elements; and, since they are each structurally in the form of a beam supported at each of its ends, there is relatively greater assurance against setting or failure than is the case for the cantilever tabs 42 of the grid 34. It is to be noted that only every other opening 137 in the grid member 134 is provided with the projections 162 for resilient lateral support of a fuel rod. Accordingly, the grids 134 in the fuel arrangement 130 are so arranged that lateral support of alternate fuel rods can be provided by the remaining grids 134.

In the foregoing description, several arrangements have been related to point out the principles of the invention. The description, therefore, has only been illustrative of the invention, and, accordingly it is desired that the invention be not limited by the embodiments described here, but rather that it be accorded an interpretation consistent with the scope and spirit of its broad principles.

What is claimed as new is:

1. A fuel arrangement for a nuclear reactor, said arrangement comprising a plurality of elongated fuel elements disposed in a generally parallel array, elongated support means juxtaposed and parallel to said fuel elements, at least one grid member extending laterally of said fuel elements having respective first openings through which said fuel elements extend, said grid member having at least one second opening through which said support means extends, means fixedly securing said support means to said grid member adjacent said second opening, said grid member formed from a plurality of cross-laced elongated rectilinear straps, said straps having a strip formed by parallel spaced slits adjacent each of said first openings, each of said strips having a resiliently mounted projection for supporting said fuel elements against lateral displacement, flow apertured plate means secured to and extending laterally of each end of said support means, and said plate means being positioned outwardly of, yet adjacent to the ends of said fuel elements respectively for retaining said fuel elements between said plate means.

2. The fuel arrangement of claim 1 wherein said projection has a generally hemispherical shape and is disposed in the center of said strip.

3. The fuel arrangement of claim 1 wherein said one grid member laterally supports only some of said fuel elements, and including a second grid member secured to and extending laterally of said support means and having respective first openings through which said fuel elements extend, said second grid member having resilient means extending into said first openings for supporting said fuel elements against lateral displacement.

4. A fuel arrangement for a nuclear reactor, said arrangement comprising a plurality of elongated fuel elements disposed in a generally parallel array, a plurality of elongated support members juxtaposed and parallel to said fuel elements at least one grid member extending laterally of said fuel elements and having respective first openings through which said fuel elements extend, said grid member having a plurality of second openings therein, each said support member extending through one of said second grid member openings, respectively, means fixedly securing said support means to said grid member adjacent said second grid member openings, respectively, said grid member having means extending into at least some of said first openings for supporting said fuel elements against lateral displacement yet permitting individual longitudinal movement by each of said fuel elements, and flow apertured plate means supportedly secured to and extending laterally from the ends of said elongated members, said plate means being positioned outwardly of the ends of said fuel elements for retaining said fuel elements longitudinally between said plate means.

5. The fuel arrangement of claim 4 wherein said elongated support members comprise tie rods and wherein said securing means comprises a plurality of elongated spacers slidably positioned over each of said tie rods, said spacers disposed between and engaging said grid member and said plate means.

6. The fuel arrangement of claim 5 wherein said grid member is rectangularly shaped and wherein each of said tie rods extends through a corner opening in said grid member.

7. The fuel arrangement of claim 6 wherein a bushing is disposed in each corner opening of said grid member, said bushing being fixedly secured to said grid member, and each of said tie rods passing through its respective bushing.

8. The fuel arrangement of claim 4 wherein said plate means comprises an end plate positioned adjacent one end of said elongated members and having respective coolant passages aligned with some of said fuel elements, another end plate secured adjacent the other end of said elongated members and having respective coolant passages aligned with the remainder of said fuel elements, and apertured retaining plates fixedly positioned longitudinally outwardly of said end plates respectively for longitudinally retaining said fuel elements within said fuel arrangement.

9. The fuel arrangement of claim 7 wherein said plate means comprises an end plate positioned adjacent one end of said tie rods and having respective coolant passages aligned with some of said fuel elements, another end plate secured adjacent the other end of said tie rods and having respective coolant passages aligned with the remainder of said fuel elements, apertured retaining plates fixedly positioned longitudinally outwardly of said end plates respectively for longitudinally retaining said fuel elements within said tie rods, and wherein detachable means is secured to each end portion of said tie rods whereby said plate means, said grid member, said tie rods, and said spacers are secured in their respective positions in the fuel arrangement.

References Cited

UNITED STATES PATENTS

| 3,015,616 | 1/1962 | Sturtz et al. | 176—78 |
| 3,068,163 | 12/1962 | Currier et al. | 176—78 |
| 3,070,534 | 12/1962 | Kooistra | 176—78 |
| 3,091,582 | 5/1963 | Bradley | 176—78 X |
| 3,137,638 | 6/1964 | Kumpf et al. | 176—78 |
| 3,185,632 | 5/1965 | Bradley | 176—78 X |

FOREIGN PATENTS

| 1,082,679 | 6/1960 | Germany. |
| 1,086,356 | 8/1960 | Germany. |
| 1,093,500 | 11/1960 | Germany. |

CARL D. QUARFORTH, *Primary Examiner.*

M. J. SCOLNICK, *Assistant Examiner.*